United States Patent
Theuer et al.

(12)

(10) Patent No.: US 10,865,986 B2
(45) Date of Patent: Dec. 15, 2020

(54) VORTEX GENERATING DEVICE

(71) Applicant: ANSALDO ENERGIA SWITZERLAND AG, Baden (CH)

(72) Inventors: Andre Theuer, Baden (CH); Urs Benz, Gipf-Oberfrick (CH); Yang Yang, Nussbaumen (CH); Michael Düsing, Rheinfelden (DE)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 370 days.

(21) Appl. No.: 15/825,686

(22) Filed: Nov. 29, 2017

(65) Prior Publication Data
US 2018/0149360 A1    May 31, 2018

(30) Foreign Application Priority Data
Nov. 30, 2016  (EP) .................................. 16201577

(51) Int. Cl.
*F23R 3/12* (2006.01)
*F02C 9/28* (2006.01)
(Continued)

(52) U.S. Cl.
CPC ............. *F23R 3/12* (2013.01); *F02C 9/28* (2013.01); *F02K 1/48* (2013.01); *F23R 3/20* (2013.01);
(Continued)

(58) Field of Classification Search
CPC ...... F23R 3/12; F23R 3/18; F23R 3/20; F23R 3/346; F02K 1/48
See application file for complete search history.

(56) References Cited

U.S. PATENT DOCUMENTS

| 5,634,327 A | 6/1997 | Kamber et al. |
| 5,941,064 A * | 8/1999 | Chevalier ................. F23R 3/20 |
| | | 60/740 |

(Continued)

FOREIGN PATENT DOCUMENTS

| CN | 105307931 A | 2/2016 |
| EP | 0 718 470 A2 | 6/1996 |

(Continued)

OTHER PUBLICATIONS

Search Report dated May 26, 2017, by the European Patent Office for Application No. 16201577.0.

(Continued)

*Primary Examiner* — Craig Kim
(74) *Attorney, Agent, or Firm* — Buchanan Ingersoll & Rooney PC

(57) ABSTRACT

A vortex generating device is provided as a generally airfoil-shaped lobed body. The flow deflection varies along a spanwise extent, such that the body exhibits a corrugated geometry in a trailing edge region, and the trailing edge exhibits an undulating shape. The undulating shape includes at least one corner. The trailing edge may include or may consist of straight trailing edge sections. The trailing edge may exhibit a polygonial waveform shape, in particular a trapezoidal or rectangular waveform shape. The vortex generating device may be provided as a fuel discharge device which is suited to discharge a fuel into a vortex flow generated by the vortex generating device. To this extent, a fuel supply plenum may be provided inside the body and at least one fuel discharge opening which is in fluid communication with the fuel supply plenum may be provided on the trailing edge.

14 Claims, 3 Drawing Sheets

(51) Int. Cl.
*F02K 1/48* (2006.01)
*F23R 3/20* (2006.01)
*F23R 3/34* (2006.01)

(52) U.S. Cl.
CPC ........ *F23R 3/346* (2013.01); *F05B 2260/222* (2013.01); *F05D 2250/61* (2013.01); *F23R 2900/03341* (2013.01)

(56) References Cited

U.S. PATENT DOCUMENTS

| | | | |
|---|---|---|---|
| 6,141,967 A | 11/2000 | Angel et al. | |
| 8,713,943 B2 * | 5/2014 | Poyyapakkam | F23C 5/08 60/737 |
| 2009/0277178 A1 | 11/2009 | Carroni et al. | |
| 2012/0272659 A1 | 11/2012 | Syed et al. | |
| 2014/0109588 A1 | 4/2014 | Ciani et al. | |
| 2014/0123665 A1 | 5/2014 | Wood et al. | |
| 2014/0127010 A1 | 5/2014 | Rose et al. | |
| 2014/0301860 A1 | 10/2014 | Ramm et al. | |
| 2015/0167979 A1 | 6/2015 | Siden et al. | |
| 2015/0292476 A1 | 10/2015 | Obrecht et al. | |
| 2016/0230668 A1 | 8/2016 | Yang et al. | |

FOREIGN PATENT DOCUMENTS

| | | | |
|---|---|---|---|
| EP | 1338793 | A2 | 8/2003 |
| EP | 1 894 616 | A1 | 3/2008 |
| EP | 2 522 911 | A1 | 11/2012 |
| EP | 2 725 301 | A1 | 4/2014 |
| EP | 2 725 302 | A1 | 4/2014 |
| EP | 3 023 696 | A1 | 5/2016 |
| WO | 2014114988 | A1 | 7/2014 |

OTHER PUBLICATIONS

Search Report dated May 15, 2017, by the European Patent Office for Application No. 16201574.7.

Office Action (First Office Action) dated Apr. 24, 2020, by the Chinese Patent Office in corresponding Chinese Patent Application No. 201711238237.3, and an English Translation of the Office Action. (21 pages).

* cited by examiner

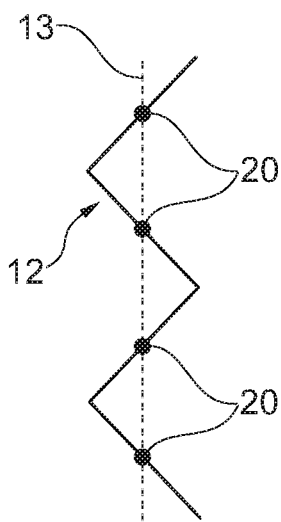 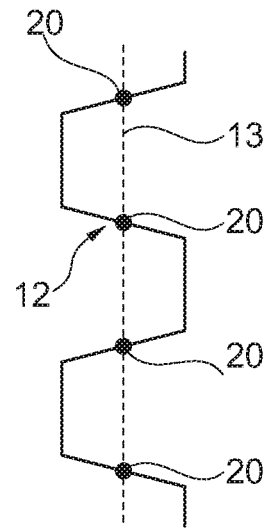 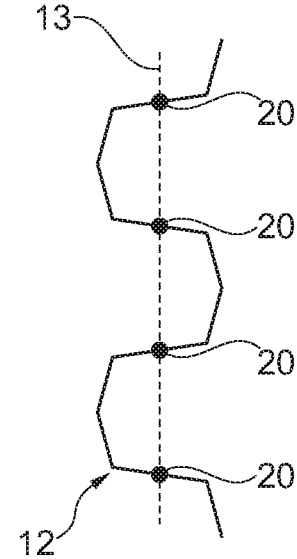
Fig. 3　　Fig. 4　　Fig. 5
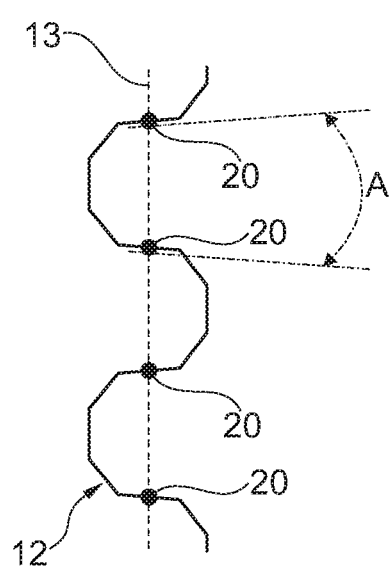
Fig. 6

VORTEX GENERATING DEVICE

PRIORITY CLAIM

This application claims priority from European Patent Application No. 16201577.0 filed on Nov. 30, 2016, the disclosure of which is incorporated by reference.

TECHNICAL FIELD

The present disclosure relates to a vortex generating device as set forth in claim 1. It further relates to a vortex generating device of the aforementioned kind which is provided as a fuel discharge device, and a sequential combustion system incorporating a vortex generating device and/or a fuel discharge device of the aforementioned kind. In another aspect, a gas turbine engine comprising a sequential combustion system is disclosed.

BACKGROUND OF THE DISCLOSURE

The application of sequential combustion has become increasingly popular in gas turbine technology. In sequential combustion, an oxidant, for instance, and most commonly, air, is admixed with fuel to form an overall lean, understochiometric, fuel-oxidant mixture. The fuel is burnt, and exits a first combustion stage. The hot, still oxygen-rich flue gas is guided to a second combustion stage. Between the first and the second combustion stage, the flue gas from the first combustion stage may be partly expanded, as for example described in EP 718 470, or not, as for instance described in US 2014/0123665. Fuel is admixed with the hot, still oxygen-rich flue gas, and ignites spontaneously. Sequential combustion bears the advantage of an excellent part load behavior and turndown ratio, that is, an engine which is operated with sequential combustion is able to be stably operated over a large load range while still allowing control of the pollutants formation. However, a prerequisite for achieving these advantages is a fast and reliable mixing of the flue gas and the injected fuel in the second combustion stage, such that the fuel is homogeneously admixed with the flue gas before it spontaneously ignites, and to avoid for instance flashback issues.

US 2012/0272659, for instance, discloses a fuel discharge device having a generally airfoil-like shape, with the airfoil trailing edge having an undulating geometry when viewed parallel to a main flow direction. The generally airfoil-shaped body of the fuel discharge device develops a corrugation in a streamwise direction from the leading edge to the trailing edge. At the trailing edge, flows having opposite velocity components across the main flow direction meet and intermingle, and develop vortices propagating downstream from the trailing edge. Said vortices have centers of rotation essentially at inflection points of the undulating trailing edge. Fuel is discharged into the oxidant flow through discharge means arranged at the trailing edge, and due to the vortices the fuel is intensively admixed with the oxidant. EP 2 725 301 and EP 2 725 302 for instance, while not to be understood as limiting, teach the application of such vortex generating devices with integrated fuel discharge means in a combustor.

While said fuel discharge devices, also referred to in the art as lobed fuel injectors, have proven outstanding performance, increasing experience has shown certain fields for potential improvement. On the one hand, the manufacturing process has proven fairly complicated and delicate. This may result in enhanced scrap rates.

EP 2 725 301 discloses a vortex generating device which is applied as a fuel injector device, wherein the undulating geometry is referred to as "lobes", and wherein the shape of the lobes, which is understood as being equivalent to the shape of the trailing edge when seen from a downstream viewpoint, comprises curved and adjunct straight sections, wherein furthermore the straight sections are asymptotic to the adjacent curves or sectors of circles.

In another aspect, experience has shown that the fuel discharge devices known from the art may in certain instances tend to flow separation. Flow separation on the one hand causes additional total pressure loss, which in turn has a detrimental effect on the overall engine efficiency, while not adding to the mixing performance of the fuel discharge device. Further, the flow separation at the corrugated injector device surface reduces the effective length along which the vortices, which are intended for fuel mixing, are generated. This may reduce mixing performance, with effects on the control of pollutants formation.

OUTLINE OF THE SUBJECT MATTER OF THE PRESENT DISCLOSURE

It is an object of the herein disclosed subject matter to disclose a vortex generating device of the initially mentioned kind. In one aspect, the vortex generating device shall be suited to be used in a fuel discharge device as mentioned above. In a more specific aspect, a vortex generating device shall be disclosed such that drawbacks of the art, such as, but not limited to, those mentioned above are avoided. In more specific aspects, the vortex generating device shall be disclosed such as to exhibit improved aerodynamics, such as, for instance, while not being limited to, to avoid flow separation mentioned above. In still another aspect, the vortex generating device shall be provided such as to generate downstream vortices which improve the mixing of fuel which is injected at a trailing edge of the vortex generating device.

This is achieved by the subject matter described in claim 1.

Further effects and advantages of the disclosed subject matter, whether explicitly mentioned or not, will become apparent in view of the disclosure provided below.

Accordingly, disclosed is a vortex generating device, said device comprising a body, wherein the body comprises a leading edge and a trailing edge. A streamwise direction is defined from the leading edge to the trailing edge. The body further exhibits and extends in a spanwise direction. It is understood, and readily appreciated by the skilled person, that, while the leading edge and the trailing edge do not necessarily extend exclusively along the spanwise direction, each of the leading edge and the trailing edge has at least an extent along the spanwise direction. Of course, embodiments are disclosed wherein in particular the leading edge extends along the spanwise direction. The body, in profile cross sections taken across the spanwise direction, exhibits an airfoil-shaped geometry. It may be said that the body is generated in staggering a multitude of airfoil-shaped profile cross sections along the spanwise direction. Each airfoil-shaped profile cross section has a camber line extending from the leading edge to the trailing edge, at least two of the camber lines, that is, the camber lines of at least two cross sections taken at different spanwise positions, exhibit different camber angles, such that the body exhibits at least two different flow deflection angles along the spanwise direction, or, in other words, exhibits at least two spanwise positions at which the camber line, and accordingly the flow deflection angle, is different. It should be noted here that a common definition of the camber angle is the external angle formed by the intersection of the tangents to the camber line at the leading edge and the trailing edge. The camber angle is equal to the sum of the angles formed by the chord line and the camber line tangents. The body further comprises a first surface extending between the leading edge and the trailing edge and comprising the airfoil-shaped profile lines on a first side of the respective camber lines, and a second surface extending between the leading edge and the trailing edge and comprising the airfoil-shaped profiles on an opposite second side of the respective camber lines. In this respect the two surfaces are located on opposing sides of the camber lines. The first and second surface join each other at the leading edge and at the trailing edge, and thus form a common outer surface of the body. In a trailing edge region, the body exhibits a corrugated shape wherein the first surface exhibits a flute extending upstream from the trailing edge and the second surface exhibits a ridge extending upstream from the trailing edge opposite said flute. On each surface, a ridge may be located adjacent a flute in the spanwise direction, and a flute be located adjacent a ridge in the spanwise direction. A multitude of flutes and ridges may be alternatingly provided on each surface and in the trailing edge region. For each flute on the first surface a ridge on the second surface may be provided on an opposite side of a camber line, and vice versa. Said geometry may be considered the result of airfoil-shaped profile cross sections with different flow deflection angles being accordingly staggered along the spanwise direction. The profiles of the profile cross sections may be identical in an upstream or leading edge region of the body. The respective camber lines may be arranged parallel to each other at the crossing with the leading edge. Due to the corrugated geometry of the body in the downstream or trailing edge region the trailing edge, when seen from a viewpoint downstream the body, exhibits an undulating shape. Undulating in this respect is not intended to stipulate a smoothly curved shape, but may also refer to, or comprise, a discontinuous undulation. The trailing edge, when seen from the downstream viewpoint, may thus comprise corners or kinks, and may comprise straight sections which abut each other at corners or kinks. However, exhibiting an undulating shape will be understood such that on each side of the trailing edge it comprises at least one concave section as well as at least one convex section. In still other words, when following the extent of the trailing edge from one spanwise end to the other spanwise end, and when seen from the downstream viewpoint, the trailing edge comprises left-hand curved or kinked, or cornered, respectively, sections as well as left-hand curved or kinked or cornered sections. Kink and corner are used largely synonymously in the context of the present disclosure, and denote a sharp and sudden change in the orientation of a line or surface, or the joint between two differently oriented abutting lines or surfaces, as opposed to a continuously curved shape. Following an extent of an edge from one to the other spanwise ends is, in the context of the present disclosure, to be understood as following a path along said edge from one end to the other end. In a virtual sense, following this path, one would be required to turn right at a right-handed or clockwise kink and to turn left at a left-handed or counterclockwise kink. Likewise, one would have to follow a left-handed curved section to the left and follow a right-handed section to the right.

The trailing edge, when seen from said downstream viewpoint, comprises at least two adjacent trailing edge sections which abut each other at a corner, and said abutting sections, or abutting tangents thereof, respectively, include a nonzero angle with each other.

The skilled person will readily understand that a corner does not necessarily imply a sharp corner with a zero radius. For a practical purpose, corners and edges, in actual technical applications, generally comprise rounded sections with comparatively small radii of curvature when comparing to the size of an overall structure. A minimum possible radius may be provided for instance by the method of manufacturing applied in primary shaping a component. In another aspect, the minimum radii may be limited by considerations as to the heat intake and a local surface/volume ratio if a component is provided in a hot gas flow. Generally, it may be assumed that, for reasons of aerodynamic performance, the downstream end of the trailing edge is provided as sharply edged as practically possible, i.e. with minimum radii of curvature in the transition from the first to the second surface of an airfoil. Said radii may be referred to as trailing edge terminal radii. Such, also a minimum trailing edge thickness is provided. Thus, when seen from a downstream viewpoint, the transition between two trailing edge sections may be considered as a corner, or kink, respectively, if a smaller radius of curvature at said transition is at maximum twice a minimum trailing edge terminal radius, and in particular is at maximum as large as a minimum trailing edge terminal radius. In other aspects, when seen from a downstream viewpoint, the transition between two trailing edge sections may be considered as a corner, or kink, respectively, if a smaller radius of curvature at said transition measures at maximum the thickness of the trailing edge, and in particular is at maximum as large as half the thickness of the trailing edge. Furthermore, when seen from a downstream viewpoint, the transition between two trailing edge sections may be considered as a corner, or kink, respectively, if a larger radius of curvature at said transition is at maximum four times a minimum trailing edge terminal radius, and in particular is at maximum as large as three times a minimum trailing edge terminal radius. In other aspects, when seen from a downstream viewpoint, the transition between two trailing edge sections may be considered as a corner, or kink, respectively, if a larger radius of curvature at said transition measures at maximum twice the thickness of the trailing edge, and in particular is at maximum as large as 1.5 times the thickness of the trailing edge. Smaller and larger radii of curvature in this respect refer to outer and inner radii of the corner when seen from a downstream viewpoint. The skilled person will further appreciate that the above formulated requirements with respect to the inner and outer radii may apply cumulatively.

It is noted that within the framework of the present disclosure the use of the indefinite article "a" or "an" does in no way stipulate a singularity nor does it exclude the presence of a multitude of the named member or feature. It is thus to be read in the sense of "at least one" or "one or a multitude of".

A vortex generating device as known from the art, having a smooth, continuously undulating trailing edge, will generate a vortex at each inflection point of the trailing edge. In other words, for each undulation "wavelength" or "period" along the spanwise extent of the trailing edge, two vortices will be generated. It is generally known, when applying the vortex generating device as a fuel discharge device, to place fuel nozzles along a midline of the trailing edge, or on the inflection points of the trailing edge, respectively. In applying the teaching of the present disclosure, that is, providing the trailing edge with kinks or corners, a vortex may be generated at each kink or corner. By virtue of the teaching of the present disclosure, it is thus possible to generate a larger amount of vortices with the same "wave number" along the spanwise extent. As will become more apparent below, it is possible to shape the trailing edge such that for a fuel discharge nozzle two adjacent vortices are generated, which intensifies the mixing of fuel with the oxidizer. This allows an even improved control of pollutants formation from combustion, and allows to move flashback conditions beyond the limits known from the art.

The leading edge, when seen from a viewpoint upstream the body, may in certain instances be non-undulating. That means, when seen from the upstream direction, the leading edge is one of straight and/or unilaterally curved or kinked. That is, when seen form an upstream viewpoint, or, in another aspect, in a cross section across an inflow direction, the leading edge may in certain embodiments be straight. It may in other instances be arcuate, or polygonial. For certain instances, it may be circular or part-circular or elliptical or part-elliptical or exhibit a kinked shape. Being non-undulating in this respect shall mean that in the mentioned direction of view the leading edge has no inflection point. The leading edge thus, when following the extent of the leading edge from one spanwise end to the other spanwise end, and when seen in the flow direction, does either exclusively comprise straight and/or left-hand curved or kinked extents, or exclusively comprise straight and/or right-hand curved or kinked extents, but does not comprise left-hand curved or kinked sections as well as right-hand curved or kinked sections. Right handed may also be denoted as clockwise, while left-handed may be denoted as counterclockwise. It may thus be said that the leading edge is straight and/or unilaterally, either clockwise or counterclockwise, curved or kinked. In still other words, the leading edge is, on each side thereof, either planar or concave or convex, but does not comprise a combination of concave and convex extents.

In line with the above specification with respect to the shape of the leading edge, the body at the leading edge may exhibit a non-corrugated shape, while the trailing edge exhibits an undulating shape when seen from the downstream viewpoint. The body accordingly is corrugated in a downstream section, and the corrugation of the body increases in a downstream direction from the leading edge to the trailing edge. That is, the depth of a flute on a surface of the body as well as the height of a ridge on a surface of the body increases towards the trailing edge.

No ridges and no flutes may be present, that is the body be non-corrugated, in an upstream or leading edge region of the body which may in certain embodiments extend from the leading edge for at least ⅓ or the chord length.

In more specific exemplary embodiments of the vortex generating device as herein described, the trailing edge comprises at least one straight trailing edge section when seen from the downstream viewpoint. In even more specific embodiments, the trailing edge may consist of, that is to say, comprise exclusively, straight trailing edge sections which abut each other at corners. The absence of three-dimensionally curved sections of the body may in this case, besides other beneficial effects of the described embodiment, serve to largely facilitate manufacturing and in particular manufacturing by means of casting.

The skilled person will readily appreciate that a generated vortex, in a given flow field, is the more intense the sharper a corner or kink of the trailing edge is, that is, the larger the angle at which two abutting trailing edge sections, or the abutting tangents thereof, respectively, are kinked. In certain instances, at least one kink angle between abutting sections amounts to at least 30°, or in excess thereof. In other instances, at least one kink angle between abutting sections of the trailing edge is larger than or equal to 60°.

In further instances, the trailing edge, when seen from a downstream viewpoint, comprises at least two corners. When following the extent of the trailing edge from a first spanwise end to a second spanwise end, the kink between the two abutting and adjacent subsequent trailing edge sections at a first corner is one of right-handed or left-handed, and the kink between the two abutting adjacent subsequent trailing edge sections at a second corner is the other one of right-handed or left-handed. Subsequent trailing edge sections in this respect refer to an order of trailing edge sections when following said extent from the first spanwise end to the second spanwise end. It is understood that in providing a left-handed corner as well as a right-handed corner, the trailing edge comprises, in a global view, an inflection point, and thus an undulating or waveform shape may be provided for a trailing edge even if consisting only of straight trailing edge sections, when seen from the downstream viewpoint. Said straight trailing edge sections abut adjacent straight trailing edge sections at right-handed or clockwise corners and at left-handed or counterclockwise corners.

It should be noted at this point that a straight trailing edge section when seen from the downstream viewpoint is not necessarily—however may in certain embodiments be—straight when seen for instance in a plan view onto the vortex generating device, as long as the projection in the references view direction is straight. That is to say, the chord length may vary along the spanwise extent.

In particular embodiments, when seen from a downstream viewpoint and when following the extent of the trailing edge from a first spanwise end to a second spanwise end each kink angle between two adjacent trailing edge sections may be smaller than 90°. In even more particular embodiments, the kink angle may be larger than or equal to 85° and smaller than 90°. Limiting the kink angle to less than 90°, for instance to less than 88° or smaller than or equal to 87°, may prove beneficial when manufacturing the vortex generating device by means of casting.

The kink angle is to be understood as an angle between a virtual extension of one of the abutting trailing edge sections beyond the corner or kink, and the other one of the abutting trailing edge sections. In another aspect it may be considered a complementary angle from the smallest angle included between two abutting trailing edge sections, or the abutting tangents thereof, respectively, to 180°, that is, 180° minus the smallest angle included between the two abutting trailing edge sections, or the abutting tangents thereof, respectively. It is understood that the choice of the angle is dependent on certain aerodynamic considerations, such as, for instance, but not limited to, considerations about vortex intensity, and, furthermore dependent on the specific geometry, the chosen manufacturing method and the manufacturing expense, such as for instance to avoid undercuts in casting. It is understood that, the larger the angle is, the higher will the total pressure losses be. It may be reasonable presumed for one instance, that values of the kink angle slightly below 90°, that is, for instance, larger than or equal to 80° or larger than or equal to 85° and smaller than 90°, for instance up to 88° or more in particular up to 87°, may provide a good aerodynamic performance combined with acceptable manufacturing expense in applying casting methods.

In further instances, the vortex generating device may be provided such that, when seen from a downstream viewpoint, within a right-handed kinked extent of the trailing edge the sum of the kink angles of all immediately consecutive right-handed kinks is less than 180°, and within a left-handed kinked extent of the trailing edge the sum of the kink angles of all immediately consecutive left handed kinks is less than 180°. In certain embodiments said sums may be less than or equal to 176° and more in particular less than or equal to 174°. Undercuts within the trailing edge lobed geometry are thus avoided. This in turn largely facilitates manufacturing by casting as the casted component can, due to the absence of undercuts, readily be removed from a casting mold. At least, no undercuts in the convoluted trailing edge region impedes removal of the cast component from the casting mold. Moreover, due to limiting said sums of the kink angles to less than 180° a draft angle is provided which further facilitates separation of the casted component and the casting mold. It is seen for instance in FIG. 8d of EP 2 725 301, wherein the sum of the kink angles of two consecutive kinks in the same orientation is 180°, that undercuts for a casting mold are present in the region of the fuel nozzles. Also, when considering FIG. 8e of EP 2 725 301, it is apparent that a casting mold would need to be removed parallel to the casted walls, and would thus be in contact with the casted walls along essentially the entire length of a straight trailing edge section. This situation is improved in limiting the sum of the kink angles of all immediately consecutive left-handed kinks and of all immediately consecutive right-handed kinks to values less than 180°.

In other disclosed aspects, however, a kink angle may be larger than or equal to 60° and smaller than or equal to 120°. More in particular, said angle may be larger than or equal to 70° and smaller than or equal to 110°. Even more in particular, said angle may be larger than or equal to 80° and smaller than or equal to 100°. in certain embodiments, said angle may be at least approximately 90°, for instance may be in a range of larger than or equal to 85° and smaller than or equal to 95°. It may generally be stated that, when applying additive manufacturing methods, angles larger than 90° as well as other undercuts may be easily manufactured, and limitations which may apply in order to facilitate a component by casting, as those mentioned above, may be disregarded.

The trailing edge may comprise a multitude of at least two straight trailing edge sections, wherein, when seen from the downstream viewpoint, each straight trailing edge section abuts another trailing edge section at a corner of the trailing edge, wherein in particular each straight trailing edge section abuts another straight trailing edge section at a corner of the trailing edge. In even more specific embodiments, the trailing edge may comprise at least three straight trailing edge sections, wherein a first one of said straight trailing edge sections abuts one of the other straight trailing edge sections at a first end of the first straight trailing edge section and at a corner of the trailing edge, and abuts a second one of the other straight trailing edge sections at a second end of the first straight trailing edge section and at a second corner of the trailing edge. In adding more and more mutually abutting straight trailing edge sections, the entire trailing edge may consist of straight trailing edge sections. It is understood that in the latter case a fraction of the corners or kinks need to be right-handed, while a further fraction of the corners or kinks need to be left-handed within the meaning outlined above, in order to provide an undulating trailing edge.

The undulating trailing edge, when seen from the downstream viewpoint, may be provided such as to exhibit the shape of a polygional waveform. It may exhibit for instance the shape of a triangular waveform, and may in other instances be provided to exhibit the shape of a trapezoidal waveform.

In certain instances of the herein described vortex generating device, the trailing edge, when seen from the downstream viewpoint, alternatingly extends on both sides of a trailing edge mean line along the spanwise extent of the trailing edge. While a specific definition of a mean line of a generally undulating trailing edge may be tough to provide, the skilled person will intuitively receive a clear and unambiguous teaching from said feature. In case the undulating trailing edge exhibits an even waveform shape, however, a unique mean line will be easily derived in considering a mean line in which the distance of the trailing edge from the mean line is an alternatingly equal absolute value on either side of the mean line, such that the trailing edge is generally point-symmetric at a crossing point of the trailing edge and the trailing edge mean line.

As implicitly suggested above, the vortex generating device as herein disclosed may be provided as a fuel discharge device, wherein at least one fuel supply plenum is provided inside the body and at least one fuel discharge opening is provided at the trailing edge, whereby further the fuel discharge opening is in fluid communication with a fuel supply plenum. That is, the fuel is discharged into a vortex flow, or a multitude of vortices, generated at the trailing edge and propagating downstream from the vortex generating device. The discharged fuel is thus intensely admixed with the fluid of the vortex flow, and a homogenous mixture may be achieved a relatively short distance downstream the fuel discharge device. At least one fuel discharge opening may be arranged at a location where the trailing edge crosses a trailing edge mean line. In other more particular exemplary embodiments, at least two fuel discharge openings are provided in fluid communication with one fuel supply plenum, wherein, when seen from the downstream viewpoint, the trailing edge along its spanwise extent alternatingly extends on both sides of a connection line between the at least two fuel discharge openings. By virtue of these embodiments, and as indicated above, the trailing edge may be shaped such as to be suited to generate a vortex on both sides of said trailing edge mean line or connection line and adjacent each fuel discharge opening. As will be appreciated, these two co-rotating vortices adjacent one fuel discharge opening and the shear flow generated between them intensify fuel-oxidizer mixing downstream the vortex generating device significantly.

The fuel discharge device comprising the vortex generating device may for instance comprise a multitude of at least two fuel supply plenums. At least one first fuel discharge opening, or a first group of fuel discharge openings, may be fluidly connected to a first of said fuel supply plenums, and at least one second fuel discharge opening or a second group of fuel discharge openings may be fluidly connected to a second one of said fuel supply plenums. It is appreciated that if more than two fuel supply plenums are provided, further fuel discharge openings or groups of fuel discharge openings maybe fluidly connected to said further fuel supply plenums. In providing the fuel discharge device with more than one fuel supply plenums, and each fuel discharge opening being selectively connected to one of said fuel supply plenums, the fuel discharge device may be adapted to, for instance, discharge multiple types of fuel or to discharge fuel for selectively selectable mixing and combustion modes. For instance, fuel discharge openings connected to a first fuel supply plenum may be provided as liquid fuel nozzles, while second fuel discharge openings connected to a second fuel supply plenum may be provided as gaseous fuel discharge openings. A liquid fuel discharge nozzle commonly differentiates over a gaseous fuel discharge opening in a manner which is readily appreciated by the skilled person. For instance, the diameter of a liquid fuel discharge nozzle may be larger, and/or the nozzle may be specifically shaped or be equipped with other means in order to atomize a liquid fuel. In said instances, in more particular embodiments, the liquid fuel discharge nozzles are provided on the trailing edge mean line, such that two vortices, that is, one vortex on each side of the trailing edge mean line, is provided adjacent each liquid fuel discharge nozzle. The gaseous fuel discharge openings may be provided and distributed at other locations of the trailing edge. A vortex generating device which is provided as a fuel discharge device may further comprise plenums for, for instance, a shielding fluid and/or an atomizing fluid. Atomizing fluid may be used to support atomization of the liquid fuel at the liquid fuel discharge nozzles. Shielding fluid may be generally used to provide a sheath of colder fluid around the discharged fuel such as to delay spontaneous self-ignition of the fuel until appropriate mixing of fuel with the hot gas is achieved. Quite commonly, air is used for both purposes, such that the shielding fluid and/or the atomizing fluid may be air; also steam or a mixture of air and steam may be applied. It is presumed to this extent that the skilled person is familiar with the general concept of injecting fuel into a hot fluid flow for sequential combustion.

As implied above, the vortex generating device according to the present disclosure, whether used as a fuel discharge device or not, may be intended for use in a hot fluid flow, for instance downstream a first combustion stage of a gas turbine engine or another combustion system. Thus, in order to adapt the vortex generating device to the accordingly high thermal load, it may be provided with a coolant supply plenum and at least one cooling duct being provided in fluid communication with the coolant supply plenum. At least one cooling duct may be provided to discharge a coolant at or adjacent to the trailing edge. Coolant for instance be air or steam or a mixture thereof.

In a further aspect, a sequential combustion system is disclosed, which comprises an upstream combustion stage and a downstream combustion stage. The downstream combustion stage is provided in fluid communication with the upstream combustion stage and adapted and configured to receive combustion gases from the upstream combustion stage. In certain instances, the sequential combustion system may be adapted to partly expand the combustion gases from the upstream combustion stage before they are received by the downstream combustion stage, as for instance disclosed in EP 718 470. In other instances, the combustion gases from the upstream combustion system may directly enter the downstream combustion system without form expansion, as for instance disclosed in US 2014/0123665. At least one vortex generating device according to the present disclosure is provided immediately upstream or in the downstream combustion stage, and in particular is provided as a fuel discharge device. It is understood that, depending on the boundaries drawn, the vortex generating device may be considered a part of the downstream combustion system or as being arranged upstream of it. However, in any case, in the meaning of the present disclosure, it is meant to be functionally coupled with the downstream combustion stage.

In still a further aspect, a gas turbine engine is disclosed which comprises the aforementioned sequential combustion system.

It is understood that the features and embodiments disclosed above may be combined with each other. It will further be appreciated that further embodiments are conceivable within the scope of the present disclosure and the claimed subject matter which are obvious and apparent to the skilled person.

BRIEF DESCRIPTION OF THE DRAWINGS

The subject matter of the present disclosure is now to be explained in more detail by means of selected exemplary embodiments shown in the accompanying drawings. The figures show FIG. 1 a simplified view of a vortex generating device according to the present disclosure;

FIGS. 3-6 a schematic differently shaped trailing edges of some exemplary instances of vortex generating devices according to the present disclosure from a downstream viewpoint;

EXEMPLARY MODES OF CARRYING OUT THE TEACHING OF THE PRESENT DISCLOSURE

Figure 1:
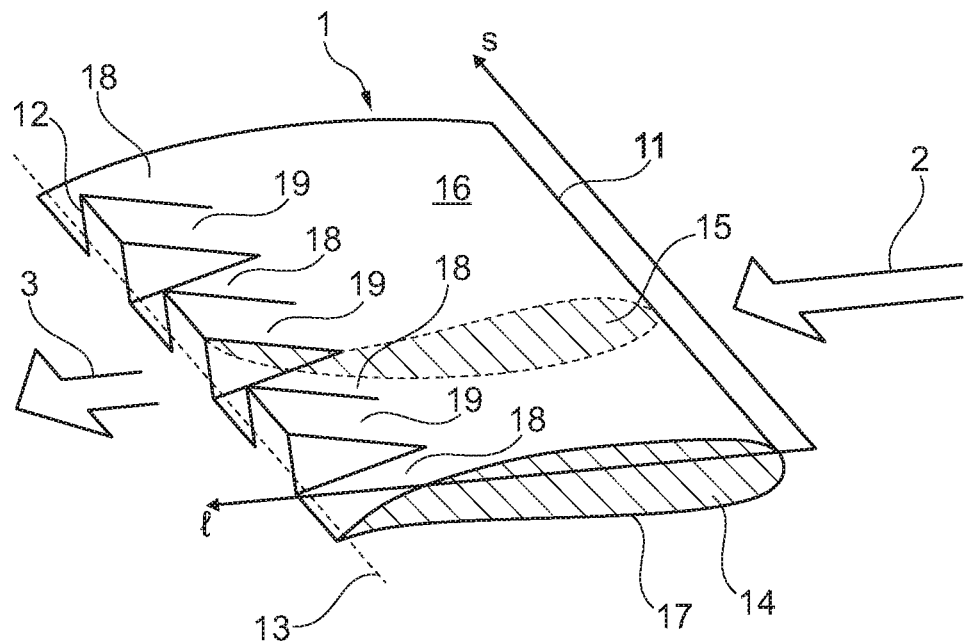

With reference to FIG. 1 an exemplary embodiment of a vortex generating device according to the present disclosure is depicted. The vortex generating device comprises a body 1. The body extends along a streamwise direction l and a spanwise direction s. Body 1 comprises a leading edge 11 and a trailing edge 12. An inflowing fluid flow is indicated at 2. An outflowing fluid flow is indicated at 3. In the present exemplary embodiment, leading edge 11 and trailing edge 12 extend along or parallel to the spanwise direction. However, each of the trailing edge and the leading edge may be provided at an angle with the spanwise direction in a plane spanned up by the streamwise direction and the spanwise direction, such that for instance the chord length varies over the spanwise direction. Cross-sections taken across the spanwise direction exhibit airfoil-shaped geometries. Two exemplary airfoil-shaped cross sections are indicated at 14 and 15. It may be said that body 1 is generated in staggering a multitude of profile cross-sections along the spanwise direction. It goes without saying, and without explicit illustration, that each of the airfoil-shaped profile cross-sections comprises a camber line and a flow deflection angle. Further, each profile cross-section is delimited by a profile line. Although these elements are not explicitly illustrated, they are perfectly clear to the skilled person. As is seen, profile cross-sections 14 and 15 exhibit different flow deflection angles. In the shown particular embodiment, the camber angles and flow deflection angles, respectively, of profile cross-sections 14 and 15 have identical absolute values, while the arithmetic sign is different, such that the flow deflection is effected in opposing directions. It may thus be said that the body exhibits two different flow deflection angles along the spanwise direction s. The profile cross-sections 14 and 15 are symmetric, and are, at least by and large, equally distributed along the spanwise direction. The profile cross-sections at the leading edge are provided with their respective camber lines parallel to each other. Thus, at least essentially the same share of total mass flow is deflected along the deflection direction effected by profile cross-section 14 as is deflected along the deflection direction effected by profile cross-section 15.

Consequently, the mean, overall flow deflection effected by body 1 is at least essentially zero. It is noted, that this is not mandatory so, but the body of the vortex generation device may be provided such as to effect a nonzero mean flow deflection, as is disclosed for instance in EP 2 522 911, refer in particular to FIG. 4 in said document. It is, however, not significant to the teaching of the present disclosure whether the mean flow deflection is zero or nonzero, and thus an exemplary embodiment with a zero mean deflection has been chosen for the ease of depiction. On a first side of the profile cross-sections the body comprises a first surface 16. It may be said that the first surface 16 comprises all profile lines of all profile cross-sections which are located on said first side. Opposite first surface 16, and not visible in the present depiction, a second surface 17 is disposed. Second surface 17 comprises all profile lines of all profile cross-sections which are located on a second side of the profile cross sections. Body 1 is non-corrugated in an upstream or leading edge region, and is corrugated in a downstream or trailing edge region. Due to the corrugation, the trailing edge, when seen from a viewpoint downstream the body, exhibits an undulating shape with a trailing edge mean line 13 as is further visible, and will become more apparent in view of the specification below. Further, in a downstream or trailing edge region of body 1, first surface 16 exhibits flutes 18 and ridges 19 which extend upstream from the trailing edge. As will be readily appreciated by the skilled person, opposite each flute 18 on the first surface 16 a ridge is provided on second surface 17. Likewise, opposite each ridge 19 on the first surface a flute is provided on second surface 17. As is further seen, flutes 18 increase in depth and ridges 19 increase in height in the downstream direction, that is, towards the trailing edge 12. As will become more apparent in view of the specification below, trailing edge 12 undulates along its spanwise extent in a non-continuous manner. That is to say, trailing edge 12, when seen from a downstream viewpoint, does not undulate smoothly and curved, or exclusively smoothly and curved, but comprises corners and kinks at which the direction along which the trailing edge extends changes in a discontinuous manner.

Figure 2:
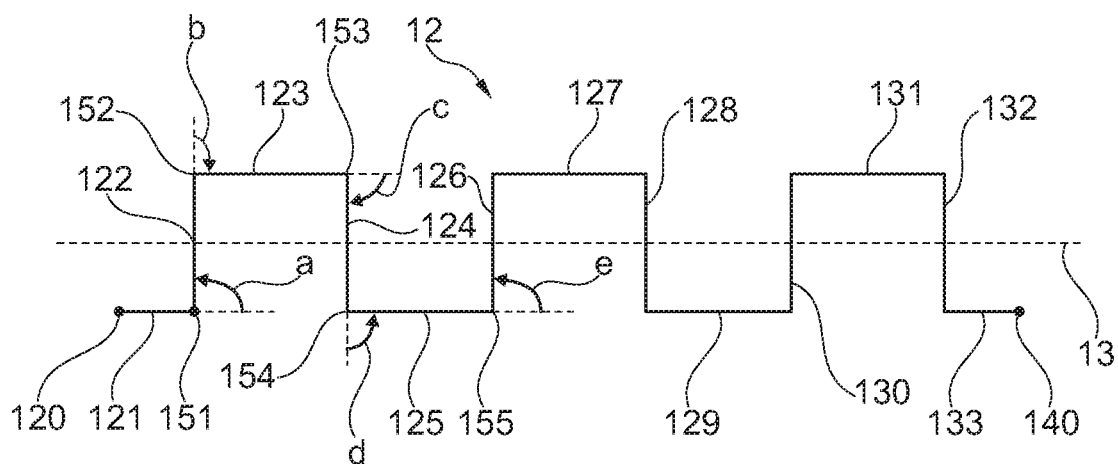
FIG. 2 a schematic view on the trailing edge of the device of FIG. 1 from a downstream viewpoint.

This is outlined in more detail in connection with FIG. 2. FIG. 2 illustrates a view from a downstream viewpoint on a trailing edge of an exemplary vortex generating device of the type herein disclosed. Trailing edge 12 extends from a first spanwise end 120 to a second spanwise end 140. Thereby, it undulates on both sides of trailing edge mean line 13, such that along the spanwise extent of the trailing edge the trailing edge is alternatingly located on both sides of trailing edge mean line 13, and crosses trailing edge mean line 13. Following an extent of trailing edge 12 from first spanwise end 120 to second spanwise end 140, trailing edge sections 121, 122, 123, 124, 125, 126, 127, 128, 129, 130, 131, 132 and 133 are subsequently arranged, wherein each pair of subsequently arranged trailing edge sections abut each other at a corner or kink of the trailing edge. Some of the corners or kinks are marked with reference numerals. As explained in more detail above, for various reasons said corners or kinks may also exhibit small radii, which are generally significantly smaller that the length of a trailing edge section between two neighboring kinks or corners. For instance, trailing edge section 121 abuts subsequent trailing edge section 122 at a corner 151 of the trailing edge. Thereby, at corner 151, the trailing edge changes its course, or is kinked, at a left-handed or counterclockwise kink angle a. Trailing edge section 122 abuts subsequent trailing edge section 123 at corner 152. At corner 152 the trailing edge is kinked with a right-handed or clockwise kink angle b. Trailing edge section 123 abuts subsequent trailing edge section 124 at corner 153. At corner 153, trailing edge 12 is kinked with a right-handed or clockwise kink angle c. Trailing edge section 124 abuts subsequent trailing edge section 125 at corner 154. At corner 154, trailing edge 12 is kinked with a left-handed or counterclockwise kink angle d. Trailing edge section 125 abuts subsequent trailing edge section 126 at corner 155. At corner 155, trailing edge 12 is kinked with a left-handed or counterclockwise kink angle e. It is readily appreciated by virtue of the foregoing description how the same applies to further subsequent trailing edge sections which abut each other at corners, wherein at the respective corners the trailing edge comprises a left-handed or a right-handed kink. Due to the presence of left-handed kinks as well as right-handed kinks, trailing edge 12, when seen from a downstream viewpoint, exhibits an undulating shape. In particular embodiments it is provided that the sum of the kink angles of all immediately consecutive right-handed kinks is less than 180°, and the sum of the kink angles of all immediately consecutive left-handed kinks is less than 180°. In the specific embodiment shown, this would mean the sum of angles b+c is less than 180°, and the sum of angles d+e is less than 180°.

It will be appreciated that by virtue of this embodiment juxtaposed trailing edge sections, like for instance 122 and 124 or 124 and 126, exhibit a divergent geometry towards the respective "open" side of the trailing edge. This in turn yields certain advantages, for instance when removing the vortex generating device from a casting mold, as is outlined above. While in the present exemplary embodiment all trailing edge sections are straight trailing edge sections, this is not necessarily the case. Curved trailing edge sections may be present and may abut other curved trailing edge sections or straight trailing edge sections at a corner, such that a kink in the trailing edge is formed. As the skilled person will readily appreciate, in this case the kink angle is defined at the abutting tangents.

In certain instances, the trailing edge, when seen from a downstream viewpoint, may exhibit a generally polygonal waveform, as is shown in more detail in connection with FIGS. 3 through 6. FIG. 3 depicts an exemplary embodiment wherein trailing edge 12 undulates in a triangular waveform on both sides of trailing edge mean line 13. FIG. 4 shows an exemplary embodiment wherein trailing edge 12 undulates in a trapezoidal waveform on both sides of trailing edge mean line 13. FIG. 5 depicts an exemplary embodiment wherein trailing edge 12 undulates in a pentagonal waveform on both sides of trailing edge mean line 13. FIG. 6 depicts an exemplary embodiment wherein trailing edge 12 undulates in a hexagonal waveform on both sides of trailing edge mean line 13. As is readily appreciated, in all exemplary embodiments shown in FIGS. 3 through 6 the sum of the kink angles of all immediately consecutive right-handed kinks is less than 180°, and the sum of the kink angles of all immediately consecutive left-handed kinks is less than 180°. As is illustrated in FIG. 6, juxtaposed terminal trailing edge sections of said right-handed and left-handed kinked extents of the trailing edge exhibit a divergent geometry towards an "open side", and include an angle A, which is a complementary angle of 180° and one of the above-mentioned sum angles. Thus, for instance a proper draft angle for the removal of the component from a casting mold is provided. When the vortex generating device is applied as a fuel discharge device, fuel discharge openings may be provided on the trailing edge. For instance, as shown in FIGS. 3 through 6, a number of fuel discharge openings 20 are provided on locations of the trailing edge where the trailing edge crosses the trailing edge mean line. It may be the case that further fuel discharge openings may be provided on the trailing edge between fuel discharge openings 20. For instance, if the fuel discharge device is provided with a dual fuel discharge capability, liquid fuel discharge nozzles 20 may be provided on trailing edge 12 and on trailing edge mean line 13, and gaseous fuel discharge openings may be provided on the trailing edge between the liquid fuel discharge nozzles. It may further be said, in another aspect, that trailing edge 12 undulates on both sides of a line connecting fuel discharge openings or liquid fuel discharge nozzles 20.

Figure 7:
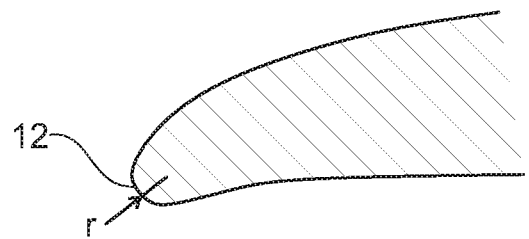
FIG. 7 an illustration of the meaning of a trailing edge terminal radius as herein used.

FIG. 7 illustrates the term "trailing edge terminal radius" as herein used. The skilled person will readily appreciate that a trailing edge will, for reasons of aerodynamic performance, be provided with as sharp a corner as possible. However, for reasons of manufacturing, thermal robustness and so forth, in practical applications a sharp corner with a zero radius may not be achieved. The trailing edge 12, in a cross sectional view of an airfoil profile, is thus provided with a radius, or a multitude of consecutive radii, r. Said radius or radii is or are herein referred to as a trailing edge terminal radius or trailing edge terminal radii. It may be stated that the smallest terminal radius found at the trailing edge is the smallest practically achievable radius. All locations which exhibit a radius in the order of magnitude of the minimum trailing edge terminal radius may thus be referred to as corners or kinks.

Figure 8:
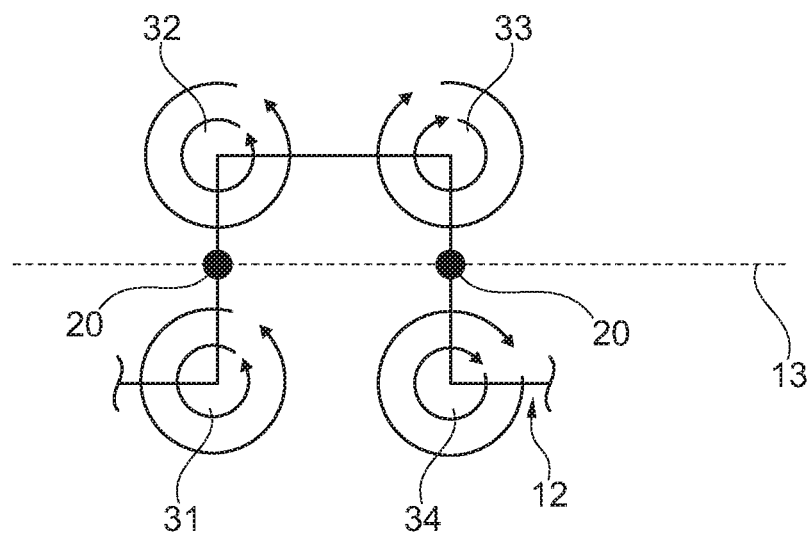
FIG. 8 an illustration of vortices emanating at the trailing edge of an exemplary vortex generating device according to the present disclosure.

FIG. 8 illustrates how two co-rotating vortices are generated at adjacent corners of the trailing edge 12 which are arranged across trailing edge mean line 13 on a trapezoidal trailing edge. The two co-rotating vortices generate a shear layer between them, at the trailing edge mean line 13, and at a location where a fuel discharge opening, and in particular a liquid fuel discharge nozzle, 20 is located. In the shear layer, a fuel discharged through fuel discharge opening 20 is intensely admixed with the flow around the vortex generating device.

Figure 9:
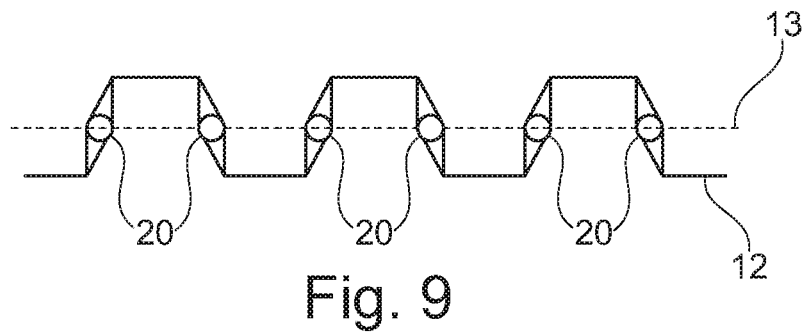
FIG. 9 a schematic view onto the trailing edge of a vortex generating device which is equipped with fuel discharge nozzles and optimized for being manufactured by a casting method from a downstream viewpoint It is understood that the drawings are highly schematic, and details not required for instruction purposes may have been omitted for the ease of understanding and depiction. It is further understood that the drawings show only selected, illustrative embodiments, and embodiments not shown may still be well within the scope of the herein disclosed and/or claimed subject matter.

FIG. 9 shows a view from a downstream viewpoint on the trailing edge 12 of a vortex generating device according to the teaching of the present disclosure which is provided and adapted as a fuel discharge device wherein the shape of the trailing edge is optimized for being manufactured by casting. As is seen, trailing edge sections which extend from fuel discharge nozzles 20 are provided slightly offset at and tangentially merging into the fuel discharge nozzles. Thus, undercuts towards the bottom or the top, respectively, in the present depiction, are avoided which enables and facilitates opening of the casting mold and removing the vortex generating device from the casting mold, as was lined out above.

It is noted that certain design features which have been mentioned above and be described as advantages in connection with manufacturing the vortex generating device by a casting method may be solved completely differently if the vortex generating device is manufactured for instance by an additive manufacturing method, such as, for instance, Selective Laser Melting (SLM) or Electron Beam Melting (EBM). These methods commonly allow for instance to manufacture a design with undercuts and require less or other design restrictions.

While the fuel discharge openings 20 have been shown being arranged on the trailing edge at crossing points with a trailing edge mean line, the skilled person is familiar with the fact that further fuel discharge openings may be provided on the trailing edge between those marked at reference numerals 20. For instance, fuel discharge openings 20 could be provided as liquid fuel discharge nozzles and be arranged on the trailing edge mean line. At this location, the liquid fuel gets effectively atomized and admixed with the fluid flow around the vortex generating device due to the shear layer which is lined out in connection with FIG. 10. On other locations of the trailing edge, gaseous fuel discharge openings may be provided, such as for instance known from EP 2 522 911, in particular in connection with FIG. 7 of said document. The gaseous fuel requires less intense vortex flows for effective mixing. Further, shielding fluid and/or coolant discharge openings may be provided on or adjacent to the trailing edge. Although those are not explicitly shown, they will be readily appreciated by the skilled person. It is presumed that the person skilled in the technical field is perfectly familiar with the potential arrangement of these openings from the abundance of art.

While the subject matter of the disclosure has been explained by means of exemplary embodiments, it is understood that these are in no way intended to limit the scope of the claimed invention. It will be appreciated that the claims cover embodiments not explicitly shown or disclosed herein, and embodiments deviating from those disclosed in the exemplary modes of carrying out the teaching of the present disclosure will still be covered by the claims.

LIST OF REFERENCE NUMERALS 1 body
2 inflowing fluid
3 outflowing fluid
11 leading edge
12 trailing edge
13 trailing edge mean line
14 profile cross section
15 profile cross section
16 surface of body
17 surface of body
18 flute
19 ridge
20 fuel discharge opening, fuel discharge nozzle
120 spanwise end of trailing edge
121 trailing edge section, straight trailing edge section
122 trailing edge section, straight trailing edge section
123 trailing edge section, straight trailing edge section
124 trailing edge section, straight trailing edge section
125 trailing edge section, straight trailing edge section
126 trailing edge section, straight trailing edge section
127 trailing edge section, straight trailing edge section
128 trailing edge section, straight trailing edge section
129 trailing edge section, straight trailing edge section
130 trailing edge section, straight trailing edge section
131 trailing edge section, straight trailing edge section
132 trailing edge section, straight trailing edge section 133 trailing edge section, straight trailing edge section
140 spanwise end of trailing edge
151 corner, kink
152 corner, kink
153 corner, kink
154 corner, kink
155 corner, kink
a kink angle
b kink angle
c kink angle
d kink angle
e kink angle
l streamwise direction, downstream direction
r trailing edge terminal radius
s spanwise direction
A divergence angle

The invention claimed is:

1. A vortex generating device, comprising:
a body having a leading edge and a trailing edge, a streamwise direction (I) being defined from the leading edge to the trailing edge, the body further having a spanwise direction (s), and the body, in profile cross sections taken across the spanwise direction, exhibiting an airfoil-shaped geometry;
each airfoil-shaped profile cross section with a camber line extending from the leading edge to the trailing edge, at least two of the camber lines exhibiting different camber angles, such that the body exhibits at least two different flow deflection angles along the spanwise direction;
a first surface extending between the leading edge and the trailing edge and including airfoil-shaped profile lines on a first side of the respective camber lines and a second surface extending between the leading edge and the trailing edge and including airfoil-shaped profile lines on an opposite second side of the respective camber lines, and the first and second surfaces joining each other at the leading edge and at the trailing edge;
the body in a trailing edge region exhibiting a corrugated shape wherein the first surface exhibits a flute extending upstream from the trailing edge and the second surface exhibits a ridge extending upstream from the trailing edge opposite said flute;
the trailing edge, when seen from a viewpoint downstream the body, exhibiting an undulating shape, wherein the trailing edge when seen from said downstream viewpoint includes a plurality of adjacent trailing edge sections which abut each other at respective corners and include respective angles (a, b, c, d) with each other,
at least first trailing edge sections of the plurality of adjacent trailing edge sections being arranged across a trailing edge median line;
at least one fuel supply plenum being provided inside the body and at least one fuel discharge opening being provided at a respective one of the first trailing edge sections, whereby the fuel discharge opening is in fluid communication with the fuel supply plenum, wherein adjacent corners of the trailing edge are arranged across a trailing edge mean line and configured to generate co-rotating vortices, the co-rotating vortices generating a shear layer between them at a location where the fuel discharge opening is located.

2. The vortex generating device according to claim 1, wherein the body at the leading edge exhibits a non-corrugated shape, the trailing edge exhibits an undulating shape when seen from the downstream viewpoint, and the corrugation of the body increases in a downstream direction (I) from the leading edge to the trailing edge.

3. The vortex generating device according to claim 1, wherein the trailing edge comprises:
at least one straight trailing edge section when seen from the downstream viewpoint.

4. The vortex generating device according to claim 1, wherein the trailing edge, when seen from a downstream viewpoint, comprises:
at least two corners, wherein, when following an extent of the trailing edge from a first spanwise end to a second spanwise end, a kink angle (a) between the two adjacent subsequent trailing edge sections at a first corner is one of right-handed or left handed, and a kink angle (b) between the two adjacent subsequent trailing edge sections at a second corner is the other one of right-handed or left handed.

5. The vortex generating device according to claim 1, wherein, when seen from a downstream viewpoint and when following an extent of the trailing edge from a first spanwise end to a second spanwise end, each kink angle (a) between two adjacent subsequent trailing edge sections is smaller than 90°.

6. The vortex generating device according to claim 5, wherein, when seen from a downstream viewpoint, within a right-handed kinked extent of the trailing edge, a sum of kink angles (b, c) of all immediately consecutive right-handed kinks is less than 180° and within a left-handed kinked extent of the trailing edge, a sum of kink angles (d, e) of all immediately consecutive left handed kinks is less than 180°.

7. The vortex generating device according to claim 1, wherein the trailing edge comprises:
a multitude of at least two straight trailing edge sections, wherein, when seen from the downstream viewpoint, each straight trailing edge section abuts another trailing edge section at a corner of the trailing edge, wherein each straight trailing edge section abuts another straight trailing edge section at a corner of the trailing edge.

8. The vortex generating device according to claim 1, wherein the trailing edge comprises:
at least three straight trailing edge sections, wherein a first one of said straight trailing edge sections abuts one of the other straight trailing edge sections at a first end of the first straight trailing edge section and at a corner of the trailing edge, and abuts a second one of the other straight trailing edge sections at a second end of the first straight trailing edge section and at a second corner of the trailing edge.

9. The vortex generating device according to claim 1, wherein the trailing edge, when seen from the downstream viewpoint, exhibits a shape of a polygonial waveform.

10. The vortex generating device according to claim 9, wherein the trailing edge, when seen from the downstream viewpoint, exhibits a shape of a trapezoidal waveform.

11. The vortex generating device according to claim 1, wherein the trailing edge, when seen from the downstream viewpoint, alternatingly extends on both sides of a trailing edge mean line along the spanwise extent (s) of the trailing edge.

12. The vortex generating device according to claim 1, wherein at least one fuel discharge opening is arranged at a location where the trailing edge crosses a trailing edge mean line.

13. A sequential combustion system, comprising:
an upstream combustion stage; and a downstream combustion stage, wherein the downstream combustion stage is provided in fluid communication with the upstream combustion stage and configured to receive combustion gases from the upstream combustion stage, wherein at least one vortex generating device according to claim 1 is provided upstream the downstream combustion stage as a fuel discharge device.

14. A gas turbine engine, comprising:
a sequential combustion system according to claim 13.

* * * * *